P. K. DEDERICK.

Improvement in Baling-Presses.

No. 5,022. Reissued Aug. 6, 1872.

Witnesses:

T. C. Brecht.

D. P. Cowl

Inventor:

Peter K. Dederick

By Daniel Breed Atty.

AM. PHOTO-LITHOGRAPHIC CO. N.Y. (OSBORNE'S PROCESS.)

UNITED STATES PATENT OFFICE.

PETER K. DEDERICK, OF ALBANY, NEW YORK.

IMPROVEMENT IN BALING-PRESSES.

Specification forming part of Letters Patent No. 99,295, dated February 1, 1870; antedated August 1, 1869; reissue No. 5,022, dated August 6, 1872.

DIVISION A.

*To all whom it may concern:*

Be it known that I, PETER K. DEDERICK, of the city of Albany, in the county of Albany and the State of New York, have invented certain new and useful Improvements in Portable Baling-Presses; and I do hereby declare that the following is a full and exact description thereof, reference being had to the accompanying drawing and to the letters of reference marked thereon.

The nature of my invention consists in a pair of levers connected at their upper ends between the timbers of the follower, and also in providing the upper ends of a pair of levers with metal caps or sockets, applied to the follower separately, and connecting them together.

Figure 1:
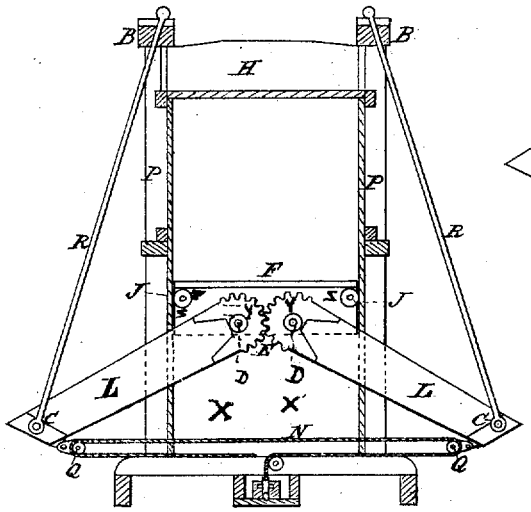
Figure 3:
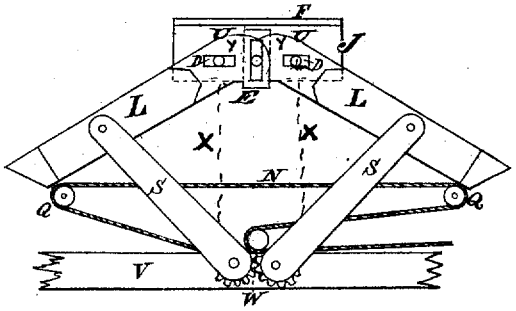
Figure 4:
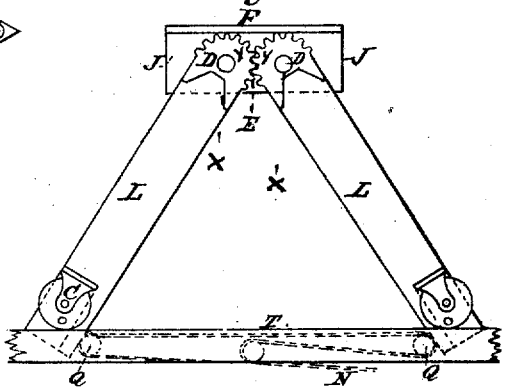
Figure 2:
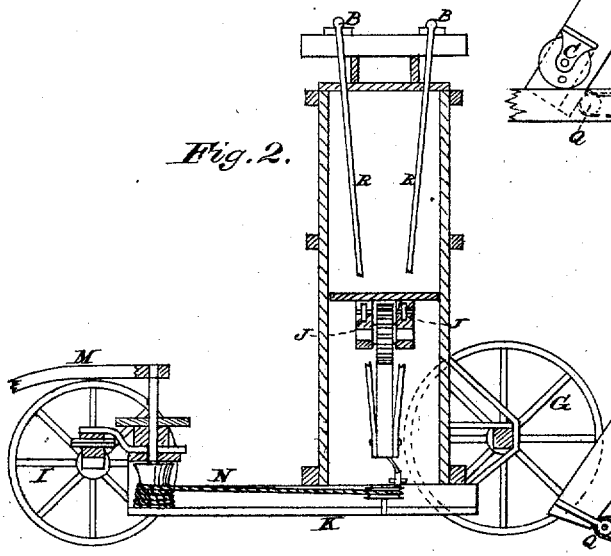
Figure 5:
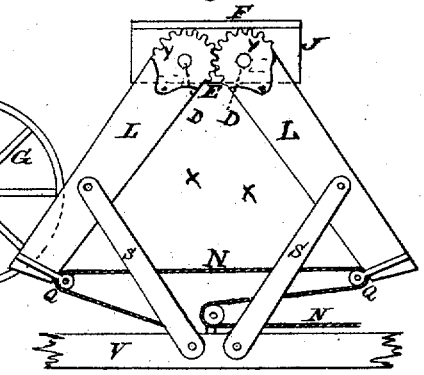

Figure 1 is an elevation and side view of a toggle-link or lever-press, showing the upper ends of the levers geared together. Fig. 2 is a vertical section of the same in connection with the windlass. Fig. 4 represents a pair of levers resting upon tracks, and having their upper ends capped with metal sockets and geared together. Fig. 5 represents a pair of toggle-levers with my improved lever-cap and connections. Fig. 3 is similar to Fig. 5, and shows some variation in the manner of connection.

P P are posts. H is the head. R R are fulcrum-rods. L L are levers; Y Y, the lever-caps or sockets; F, the follower, provided with friction-rollers Z. J J are the follower-timbers. The rods R R are attached above the head H to cross-timbers B, and their lower ends are attached to the ends of the levers L L at the points C C by a pin passing through them or on cast projections. The upper ends of the levers L L are secured to the follower-timbers J J at the points D D by a pin or cast projection on the head-irons. Said head-irons are cast caps or sockets geared together, as shown at E, so that one lever cannot move without the other. The power is applied at the lower end of the levers at the point Q, thus separating the centers C and Q, which, in starting, increase the power. The dotted lines X X are the perpendiculars of the points where the power of the levers is applied to the follower, and the center line is the center of the follower and press. N is the rope, which passes out at the side of the press and direct to the capstan, as shown. Fig. 4 is a side view of the power of the railroad press, showing my improvements applied to keep the follower level. F is the follower; L L, the levers. T is the track, of which there are two, one on each side of the levers, on which the levers L L rest and move along on rollers or wheels O O. The levers L L are attached to the follower F at the points D D, and provided with metal caps or sockets at their upper ends, and connected at the point E, as described in Fig. 1. Fig. 5 is a side view of the power of the toggle-joint press in general use, showing my improvements at the upper ends of the levers to keep the follower level. F is the follower; L L, the levers. S S are fulcrum levers or knees, of which there are four, two on the opposite side of the levers from those shown, and all resting on timbers V at the foot of the press. The upper ends of the levers L L are secured to the follower F at the point D D, and are provided with metal caps or sockets at their upper ends and geared together as in drawing already described. The upper ends of the levers may be attached between the perpendiculars of the points, where the levers are applied in various ways—for instance, as shown in Fig. 3. The upper ends of the levers L L are secured together at the point E by an iron pin so as to form a joint, and the ends of the pin allowed to play up and down in a slot or otherwise secured so as not to move toward either end of the follower. The levers L L are applied against the follower at the points D D, which must move in the slots shown, as the power moves upward; or the levers L L, secured together as shown, may be applied against the follower F at the points U U, if desired, and allowed to revolve in sockets of suitable shape to receive the surfaces of the upper end of the lever. Securing the feet of the fulcrum levers or knees together by gear or otherwise, as shown at the point W in Fig. 3, would produce similar effect, but would require much more strength of attachment. This arrangement is applicable to any kind of lever-press, in all of which legs or guides are now used to keep the follower level, which soon becomes worn so as to allow a little play, thus making one end of the bale larger than the other. The power is applied to the levers L L through the rope N, which is wound on the capstan, thus forcing the follower F upward by the levers L L pressing against it at the points D D in Fig. 1 and revolving the gear, which keeps one lever from moving faster than the other, thus holding the follower level during the operation without friction or loss of power, as whatever power may be applied to one lever more than the other is communicated through the connection to the other.

Having thus described my invention, I claim—

1. The levers L L, connected at their upper ends between the timbers J J of the follower F, when said levers are applied to the follower at separate points on opposite sides of the center, substantially as and for the purpose set forth.

2. I claim the levers L L, provided with metal caps or sockets, connected together, when said levers are applied to the follower at separate points on opposite sides of the center, substantially as and for the purpose set forth.

PETER K. DEDERICK.

Witnesses:

A. M. DEDERICK,

JAMES RORABACK.